Patented Nov. 9, 1937

2,098,762

UNITED STATES PATENT OFFICE 2,098,762

METHOD OF HARD BURNING DIATOMACEOUS EARTH

Richard W. Schmidt, Redondo Beach, Calif., assignor to The Dicalite Company, Los Angeles, Calif., a corporation of Delaware No Drawing. Application December 12, 1935, Serial No. 54,089

5 Claims. (Cl. 252—2)

It is present practice to calcine diatomaceous earth with various salts of the alkali metals (usually sodium chloride, sodium carbonate, or sodium silicate) for the combined purposes of hardening the diatom structures and improving the color of the earth.

Raw earth, as mined, has usually a certain proportion of gelatinous silica containing water of hydration and is unsuited to the manufacture of the higher grades of filter-aid until after it has been heat treated. This treatment consists in calcining the comminuted earth in direct contact with oxidizing fire-gases in a rotary kiln and results in the driving off of the water of hydration, in a certain degree of shrinkage of the diatoms, and in a very material hardening and toughening of the structure of the earth, by all of which the filtering properties are greatly improved.

Almost all diatomaceous earths contain salts of iron and the burning of such earths usually imparts to them a pinkish or reddish color which is undesirable for many purposes. In order to prevent the development of this color and to produce a pale colored or white earth it is customary to add to the earth, prior to or during calcination, a salt of an alkali metal as for example sodium carbonate or sodium silicate. This treatment results in a decided discharge of color and in most cases in the production of a calcined earth of excellent filtering quality and of a high degree of whiteness. A preferred method of conducting this calcination with sodium silicate is described in United States Patent 1,970,204, issued to McKinley Stockton on August 14, 1934.

It will be understood that this calcining operation is performed while maintaining the earth particles separate and individual, in other words, with the least possible avoidance of fritting or agglomeration of the earth particles into masses. In practical operation in a rotary kiln it is impossible to avoid a limited degree of balling or agglomeration into large and small lumps, but the greater part of the charge should pass through the kiln as an incoherent powder and such lumps as do form should be of such consistency that they may be broken or crushed between the fingers. If the operation be so conducted that the earth forms masses which resist any considerable pressure, these masses cannot be reduced to powder without breaking down the structure of the component diatoms with a serious reduction or even the complete destruction of the value of the product as a filter-aid.

The necessity for avoiding fritting of the powder places a very definite limit on the temperature to which the earth may be subjected in calcining with alkali metal salts. These salts act as fluxes for certain constituents of the raw earth, probably clays or clay-like bodies. If this fluxing action be carried too far by the use of too high a temperature, the earth is partially or entirely sintered and its value destroyed. This temperature limit, however, is not a constant but varies with the properties of the raw earth and with the dosage of the alkali metal salt. If the earth runs high in clay or if the dose of the salt be large, the maximum temperature to which it may be heated without damage may be as low as 1700° F. while purer earths with smaller doses of the salt may be carried as high as 2000° F. without agglomeration. This latter temperature can seldom be exceeded when using such salt doses as are required in practice, though some earths with very small doses of the salt (of the order of 2%) may be carried to 2200° F.

The temperatures herein referred to are not kiln temperatures, which of necessity vary from end to end of the kiln and are difficult of accurate determination, but are temperatures to which the earth mass may be heated equally in all its parts, as in an outside fired muffle.

For some purposes it is desirable to provide a filter-aid having a greater color stability than that yielded by the above described calcination with an alkali metal salt at a relatively low temperature. For example, in the manufacture of titanium oxide pigments, which are of an extreme degree of whiteness, it is common practice to precoat a filter cloth with a diatomaceous earth filter-aid, to collect the oxide particles on this filter-aid layer, and to remove the collected oxide from the filter press in such manner that the oxide is removed in intermixture with the filter-aid. The proportion of filter-aid so intermixed with the oxide is small in terms of weight, usually more or less one percent, but because of the great difference in specific gravity the earth forms an appreciable proportion of the bulk of the mixture.

The next step in the manufacture of the pigment is to calcine the above mixture at approximately 950° C. (1742° F.). After this calcination followed by cooling the color of the mixture is perceptibly darker than it was before. The reason for this darkening is unknown to me but it is evidently due to the filter-aid as the oxide alone may repeatedly be heated to this temperature without change in color. But whatever the reason, it has heretofore been impossible, so far as I am aware, to provide a diatomaceous earth filter-aid which could be heated to this temperature in contact with titanium dioxide without producing an appreciable and very undesirable degradation of the color.

In endeavoring to avoid this highly deleterious behavior of the diatomaceous earth filter-aids I have discovered that this darkening on second ignition may be wholly overcome if the filter-aid be calcined in the first instance at a temperature above the ordinary fritting temperature for that specific earth and salt dosage, and that the fritting which would otherwise attend the use of the higher temperature may be avoided by the presence in the calcination step of an alkaline-earth oxide.

For example, a comminuted raw earth suitable for the manufacture of filter-aid was calcined at 2400° F. with the addition of 5% by weight of normal sodium carbonate and 5% by weight of calcium hydroxide. At this temperature and with this dosage of alkali metal salt, the particular earth used would have sintered to a solid mass had the lime not been present, in fact the filtering value of the earth would have been seriously depreciated by carrying the temperature above 2000° F. The lime being present, fritting was entirely absent, the mixture maintaining its powdery consistency through the heat treatment. The calcined product, when mixed with titanium oxide in small proportions, did not depreciate the whiteness of the oxide, nor was the color of the mixture degraded by the above step of recalcination and cooling.

Further experiment has shown that the same effects may be produced by the use in the initial calcination of such compounds of any of the three metals calcium, magnesium, and barium as yield the corresponding oxides when heated to a temperature somewhat below that of the calcination. Such compounds may, for example, be the carbonates or the hydroxides and these in fact are preferable to the oxides themselves because of the cost of reducing the alkaline-earth oxides to powdered form. I have also found that the dose of the alkaline-earth oxide may be varied over a rather wide range, as for example from as little as 1% by weight up to 5% or even more (figured as CaO and corrected for a different molecular weight of the compound actually used).

These variations will follow differences in the characteristics of different earth, in the temperature to which the calcination is to be carried, and in the dosage of alkali metal salt. The latter may vary, for example, from 1% to 7% of the weight of the earth, figured as normal sodium carbonate, $Na_2CO_3$, and corrected for the different combining weight of sodium silicate or such other salt as may be used.

It will be evident that the compounds of calcium, magnesium, and barium previously referred to as yielding the corresponding oxides at a temperature somewhat below that of calcination may be produced in the earth mass by chemical reactions in which one of the starting materials is an alkaline-earth salt which does not itself yield the oxide on heating.

Thus, for example, calcium chloride solution added to the earth together with sodium carbonate or sodium hydroxide will yield sodium chloride and calcium carbonate or hydroxide. The sodium salt will then function as the fluxing agent and the precipitated calcium salt as the calcium compound yielding the oxide on heating. As the carbonates and the hydroxides of calcium, magnesium, and barium are all but slightly soluble in water, they will be precipitated from any soluble salt of either of these metals on contact with solutions of carbonates or hydroxides of the alkali metals. Such precipitation will, of course, involve only equimolecular proportions of the two salts, but any desired excess of either may be used.

Little can be done in the way of predetermining the optimum dosage of the alkaline-earth oxide other than by experiment. The optimum dose of the alkali metal salt will ordinarily be that which yields the whitest product at ordinary calcination temperatures in the absence of the alkaline-earth. As this dose increases, and as the temperature of calcination with the alkaline-earth is raised, the optimum dose of alkaline-earth will also increase. These generalities can be no more than a guide toward experiment with any particular earth, taking into consideration the temperature to which it is found desirable to carry the calcination. This temperature may vary, with different earths and for different purposes, from as low as 2000° F. or the temperature of incipient sintering for the particular earth up to as high as 2600° F.

The product of the calcination with alkali metal salts in the presence of alkaline-earth oxides will be found useful for purposes other than that above described. For example it may be used in the same manner in the manufacture of barium sulfate or zinc oxide in the wet way, or for any other purpose in which a superior degree of whiteness must be preserved through a second calcination step. The product also has the advantage for some purposes of a reduced proportion of acid soluble iron, this element apparently forming alkaline-earth ferrosilicates which are less soluble than the iron salts existing in the raw earth or in earth calcined with alkali metal salts alone. Further, the method may be used in the production of a superfine or "baghouse" product, having the merits of extreme whiteness for use as a filler in paper manufacture and of low acid solubility for use in making battery boxes and other acid containers. When properly controlled the addition of the alkaline-earth oxide does not increase the acid solubility but actually decreases it, the lime or other alkaline earth entering into insoluble combinations.

The low solubilities of the product of calcination in the presence of an alkaline-earth oxide as above described are highly remarkable, particularly when it is considered that a fairly large proportion of water soluble and acid soluble materials have been added to the raw earth.

In the following figures the solubility in various substances is compared, the basis for the comparisons being:

(a) The product of the invention;
(b) The raw earth from which the product was made, this earth having been calcined in the condition in which it was mined and without any previous treatment to lower its solubilities;

(c) The best product which I have heretofore been able to make from this raw material by the same process with the omission of the alkaline-earth oxide;

Solubility in water

| | Percent |
|---|---|
| (a) Product of the invention | 0.28 |
| (b) Raw earth material | 0.60 |
| (c) Best previous product | 0.48 |

Solubility in 40% strength sulfuric acid

| | Percent |
|---|---|
| (a) Product of the invention | 1.50 |
| (b) Raw earth material | 5.00 |
| (c) Best previous product | 2.00 |

Iron (as Fe) soluble in citric acid solution

| | Percent |
|---|---|
| (a) Product of the invention | 0.051 |
| (b) Raw earth material | 0.192 |
| (c) Best previous product | 0.073 |

Iron (as $Fe_2O_3$) soluble in port wine

| | Parts per million |
|---|---|
| (a) Product of the invention | 2.0 |
| (b) Raw earth material | 6.4 |
| (c) Best previous product | 5.0 |

Solubility in hydrochloric acid

| | Percent |
|---|---|
| (a) Product of the invention | 2.6 |
| (b) Raw earth material | 2.6 |

The last comparison above is particularly pointed out as showing that the alkaline-earth metal enters into an acid-insoluble combination with the silica of the earth. The salts of the alkali metals are at least partially volatile at the temperature of calcination, but the alkaline-earth hydroxides and oxides are substantially or entirely nonvolatile. The product of the invention, resulting from calcination of the raw earth with 5% of its weight of calcium oxide, contained no more lime soluble in hydrochloric acid than did the original earth, proving conclusively that the lime had gone into acid-insoluble combination.

I am aware that diatomaceous earth has previously been burned with lime, clay, and other materials to form heat insulating bricks and other fabricated bodies. The products of these methods are sintered and of such hardness that they cannot be reduced to the fineness required in a filter-aid without destroying their value for that purpose. I limit my invention to processes in which the original structure of the diatomaceous earth is preserved by maintaining it in a substantially incoherent condition throughout the heating step, reserving in the term "substantially" the unavoidable and relatively slight agglomeration of particles into readily broken balls and masses hereinabove described.

Where in the attached claims I refer to oxides of certain of the alkaline-earth metals it will be understood that I claim not only the oxides themselves but also such compounds of these metals as produce the corresponding oxides at the temperature at which the calcination is conducted.

I claim as my invention:

1. The method of producing a superwhite calcined diatomaceous earth which comprises: calcining said earth with from 1% to 7% by weight of a water-soluble salt of an alkali metal to a temperature not below 2000° Fahr., and preventing material fritting of said earth by the addition thereto of an oxide of a metal selected from the group consisting of calcium, magnesium, and barium in quantity substantially equal to that of said alkali-metal salt.

2. The method of producing a super-white calcined diatomaceous earth which comprises: calcining said earth with the addition of approximately 5% of its weight of a water-soluble alkali-metal salt together with an approximately equal quantity of an oxide of a metal selected from the group consisting of calcium, magnesium and barium, and completing said calcination at a temperature approximating 2400° Fahr.

3. In the calcination of diatomaceous earth, the steps comprising: adding to said earth a water-soluble salt of an alkali metal tending to lower the fritting temperature of said earth; offsetting said lowering effect by further adding an oxide of a metal selected from the group consisting of calcium, magnesium and barium, and completing said calcination at a temperature not substantially lower than the original fritting temperature of said earth.

4. In the calcination of diatomaceous earth, the steps comprising: adding to said earth a water-soluble salt of an alkali metal tending to lower the fritting temperature of said earth; offsetting said lowering effect by further adding a compound of a metal selected from the group consisting of calcium, magnesium and barium, said compound being adapted to yield the oxide of said metal on heating, and completing said calcination at a temperature not substantially lower than the original fritting temperature of said earth.

5. In the calcination of diatomaceous earth, the steps comprising: adding to said earth a water-soluble salt of an alkali metal tending to lower the fritting temperature of said earth; offsetting said lowering effect by further adding a water-soluble salt of an alkali-earth metal selected from the group consisting of calcium, magnesium and barium, said salts being capable of chemical reaction to produce another salt of said alkali metal and a compound of said alkaline-earth metal adapted to yield the oxide of said metal on heating, and completing said calcination at a temperature not substantially lower than the original fritting temperature of said earth.

RICHARD W. SCHMIDT.